US007163143B2

(12) United States Patent
Miette

(10) Patent No.: US 7,163,143 B2
(45) Date of Patent: Jan. 16, 2007

(54) METHOD OF DELAYING PRINTING OF AN IDENTITY CODE ON A MAIL ITEM

(75) Inventor: Emmanuel Miette, Saint-Gratien (FR)

(73) Assignee: Solystic, Gentilly (FR)

(*) Notice: Subject to any disclaimer, the term of this patent is extended or adjusted under 35 U.S.C. 154(b) by 0 days.

(21) Appl. No.: 11/099,546

(22) Filed: Apr. 6, 2005

(65) Prior Publication Data

US 2005/0234588 A1 Oct. 20, 2005

(30) Foreign Application Priority Data

Apr. 7, 2004 (FR) .................................. 04 50702

(51) Int. Cl.
*G06K 9/00* (2006.01)
*B07C 5/02* (2006.01)

(52) U.S. Cl. ...................... 235/375; 209/584; 209/3.3; 382/101

(58) Field of Classification Search ................ 382/101, 382/102; 235/375; 209/546, 584, 3.3, 900
See application file for complete search history.

(56) References Cited

U.S. PATENT DOCUMENTS 6,520,407 B1 * 2/2003 Nieswand et al. .......... 235/375
6,577,749 B1 * 6/2003 Rosenbaum ................ 382/101
6,665,422 B1 * 12/2003 Seidel et al. ................ 382/101
6,768,810 B1 * 7/2004 Emanuelsson et al. ...... 382/101
2001/0054031 A1 12/2001 Lee et al.
2002/0172399 A1 11/2002 Poulin et al.

FOREIGN PATENT DOCUMENTS

| | | | |
|---|---|---|---|
| DE | 197 05 891 | C | 3/1998 |
| WO | WO 97/49503 | A | 12/1997 |
| WO | WO 00/00300 | A | 1/2000 |
| WO | WO 01/65472 | A | 9/2001 |
| WO | WO 03/004178 | A | 1/2003 |

* cited by examiner

*Primary Examiner*—Jared J. Fureman
*Assistant Examiner*—Jamara A. Franklin
(74) *Attorney, Agent, or Firm*—Sughrue Mion, PLLC

(57) ABSTRACT

The method of handling mail items (1) in a mail handling machine (2) comprises steps consisting in delaying printing of an identity code (19) on a mail item until address information is determined by deriving a digital imprint (9, 13) characterizing the mail item from the image (4) of the mail item, thereby making it possible to avoid printing an identity code on mail items that have foreign destinations. An extended identity code is printed on all of the mail items that do not have foreign destinations.

6 Claims, 2 Drawing Sheets

METHOD OF DELAYING PRINTING OF AN IDENTITY CODE ON A MAIL ITEM

Figure 1:
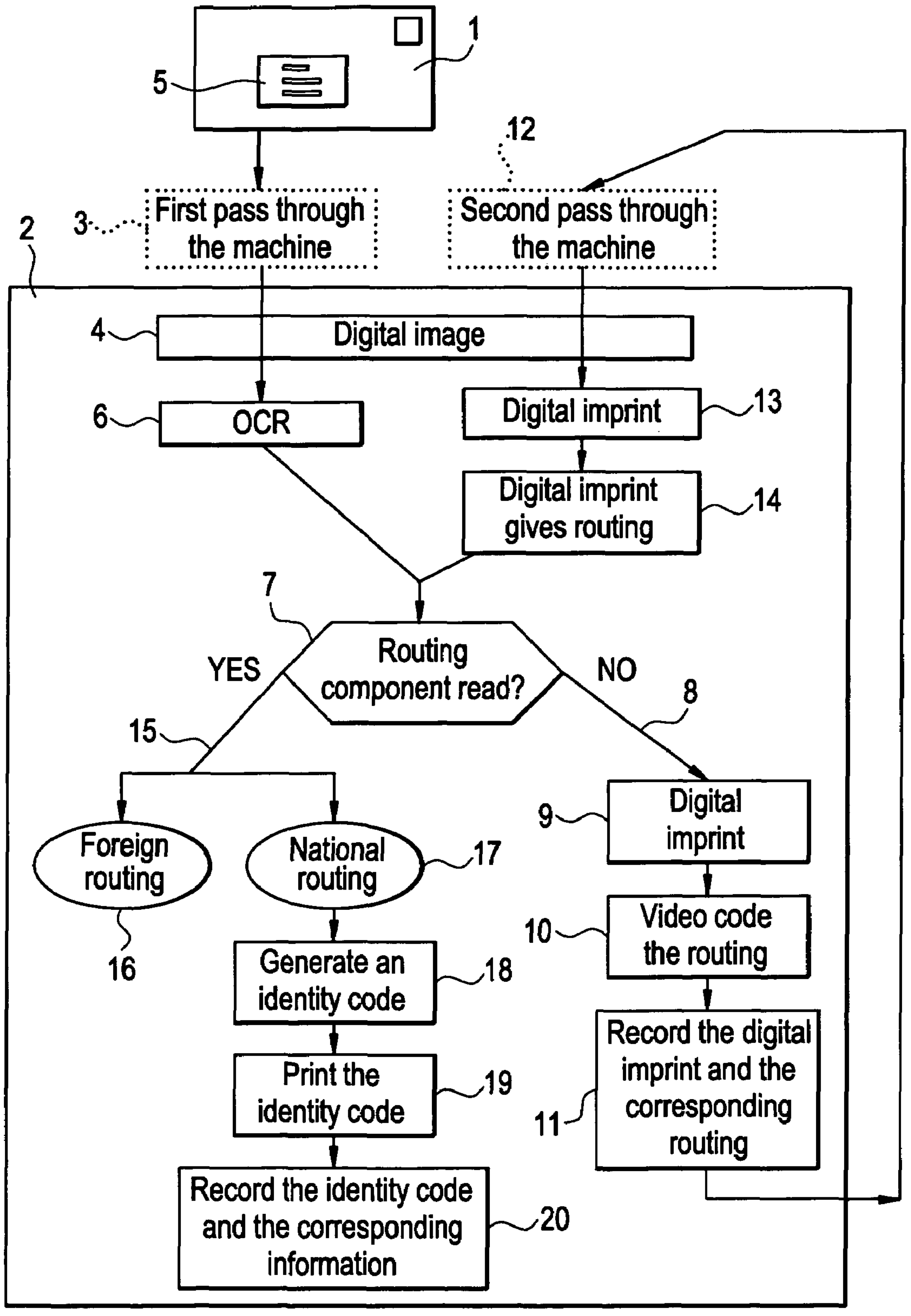

The invention relates to a method of handling mail items in a mail handling machine, such mail items including "foreign destination" mail items, and each mail item having a surface including address information, which methods consists in:

forming a digital image on the surface of the mail item that includes the address information; and performing an automatic address recognition operation by optical character recognition (OCR) for the purpose of determining the address information of the mail item.

The invention relates more particularly to a method of handling letters and other small-format flat mail items, which method is suitable for use in the French postal sorting system.

Currently in France, a postal address is constituted by an outward or "routing" component indicating towards which postal sorting center or towards which post office the mail item should be sent (post code or "ZIP" code, city, state, country, etc.), and by an inward or "distribution" component indicating at which distribution point the mail item should be distributed (post box, street, company name, etc.). When the address of a mail item is recognized automatically and unambiguously by means of an automatic address recognition operation by OCR, the following codes are printed on the bottom zone of the front (surface on which the address and the stamp are situated) of the mail item: a distribution code, e.g. in the form of a bar code, corresponding to the distribution point of the mail item, and a routing code corresponding to the routing point of the mail item (post code). However, when one of the components, namely the "routing" component or the "distribution" component cannot be recognized automatically in unambiguous manner, a code for identifying the mail item or "ID tag", also in the form of a bar code, is printed on the mail item for the purpose of processing the mail item by video coding.

The current identity code is formed by a cyclic iterative portion and by a portion identifying the machine that generated the identity code. The identity codes in current use in mail handling processes intrinsically cover only a limited spectrum. In practice, it is possible at present to identify mail items that have been rejected from OCR processing over the period of the last five working days of mail handling. Today, additional needs exist for providing traceability for mail items beyond outward and inward sorting processes. Unfortunately, until now, only those mail items that are rejected from the automatic OCR recognition process bear a printed identity code that makes such traceability possible. In addition, it is currently desirable to enable each mail item from a batch of mail items that have been passed through the machine to be associated easily with information such as, for example, the value of the postage amount for the mail item, that can be archived in a database so as to be retrieved on request on the basis of an index constituted by an identity code affixed to the mail item and suitable for being read back by machine. However, that extension of features must be provided without calling into question the existing installations of mail item sorting machines.

In addition, the zone of the mail item on which the identity code is printed is a zone reserved for national handling of the mail item, but if the mail item is a mail item with a foreign destination, i.e. a mail item that is to be distributed outside the national zone, the identity code printed on the mail item for performing the video coding operation must be masked by affixing a label, which gives rise to additional costs in handling the mail items.

An object of the invention is to propose such a method of handling mail items that makes it possible to avoid printing identity codes on the mail items that have foreign destinations.

Another object of the invention is to propose such a method of handling mail items that also makes it possible to identify individually a large number of mail items by means of an identity code covering a broader spectrum but that is compatible with current mail handling machines.

To this end, the invention provides a method of handling mail items in a mail handling machine, such mail items including "foreign destination" mail items, and each mail item having a surface including address information, which methods consists in:

forming a digital image on that surface of the mail item which includes the address information; and performing an automatic address recognition operation by optical character recognition (OCR) for the purpose of determining the address information of the mail item;

said method being characterized in that:

when the address information cannot be automatically recognized unambiguously, the method further consists in:

deriving a digital imprint from the digital image of the mail item, which digital imprint serves to identify the mail item in the machine in order to perform an address recognition operation by video coding; and generating an identity code for the mail item and printing it on the mail item if the address information recognized by video coding corresponds to address information of a mail item that does not have a foreign destination.

With the method of the invention, printing of the identity code on the mail item is thus deferred so long as the address information is not fully recognized.

The method of the invention may advantageously have the following features:

if the address information has been recognized unambiguously by OCR, the method further consists in generating an identity code for the mail item and in printing it on the mail item if the address information corresponds to address information of a mail item that does not have a foreign destination;

the identity code is an extended identity code made up of at least one iterative cyclic portion and of a portion derived from the address information recognized by OCR or by video coding;

the portion derived from the address information is a post code; and an identity number is assigned to the mail handling machine and the extended identity code printed on the mail item includes, inter alia, the identity number of the machine.

The invention also provides a machine for handling mail items, said machine being arranged to implement the method as defined above.

Figure 2:
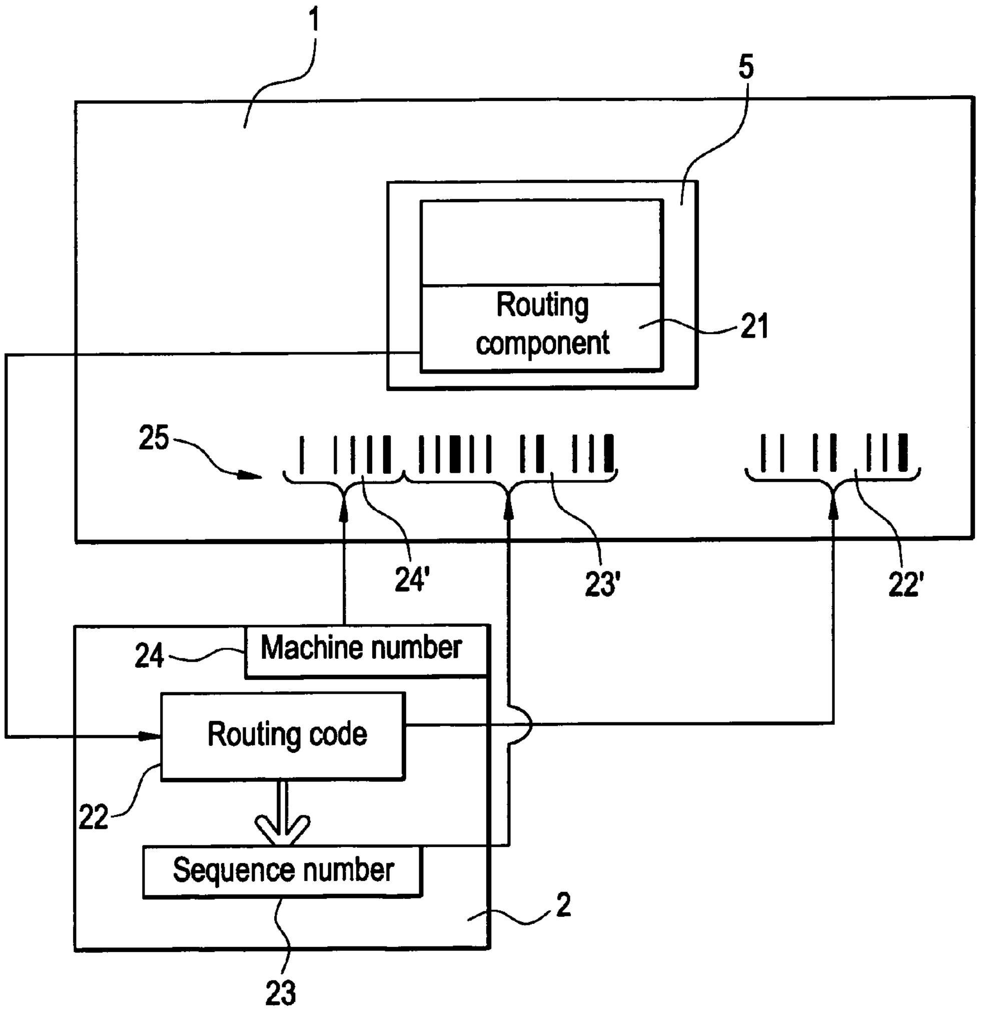

The method and the machine of the invention for handling mail items are described below with reference to the drawings, in which:

FIG. 1 is a flow chart of the various steps of the method of the invention; and FIG. 2 is a flow chart that shows very diagrammatically how the extended identity code is generated in the method of the invention.

FIG. 1 diagrammatically shows the various steps of the mail item handling method of the invention.

During the first pass 3 of a mail item 1 through a machine 2 for handling mail items for outward and inward sorting purposes, a digital image 4 is formed on the front of the mail item 1, where the address 5 of the addressee is situated, and, on the basis of the digital image 4, an automatic address recognition operation 6 is performed by OCR with a view to determining automatically the routing component 7 of the address 5, which component is generally the post code.

In the situation 8 when the routing component 7 has not been recognized unambiguously by OCR, a digital imprint 9 characterizing the mail item 1 is derived from the digital image 4 on the mail item 1. The digital imprint 9 serves as an index in a database used by the video coding system, and is, for example, an image signature such as the image signature described in Patent Document FR-2 841 673 and comprising a first component representing a physical characteristic of the digital image and a second component extracted by OCR from the digital image.

After building the digital imprint for the mail item rejected from the OCR recognition processing, a routing component recognition operation 7 is performed by video coding 10 for recognizing the routing component of the address, and said routing component of the address is recorded 11 in a database (in a machine memory) in correspondence with an index constituted by the digital imprint 9 of the mail item 1. At this stage, no mail item identity code is printed on the mail item.

The mail item 1 can be handled by another machine or recycled into the inlet of the machine 2 for a second pass 12 during which a digital image 4 is again formed on the front of the mail item 1, and a digital imprint 13 characterizing the mail item 1 is again derived from the digital image 4. On the basis of the digital image 13 of the mail item 1, the results of the video coding operation 10 recorded in the database, and in particular the routing component 7, are retrieved 14 from the database (memory).

On the basis of analysis of the routing component obtained at 14, it is determined at 15 whether said routing component corresponds to a mail item having a foreign destination 16, and if so, no code is printed on the front of the mail item 1, but an international identity code can be printed on the back of the mail item 1.

When the routing component 7 corresponds to a mail item with a national destination 17, an extended identity code is generated 18 for the mail item, and said extended identity code (whose make-up is described below with reference to FIG. 2) is printed 19 on the bottom zone of the back of the mail item 1. The extended identity code can serve as an index to identify the mail item 1 in subsequent handling. In FIG. 1, reference 20 designates recording the extended identity code serving as index in correspondence with information on the mail item 1.

As shown in FIG. 1, when the routing component is recognized unambiguously 7 by OCR 6, an identity code is generated 18 and printed 19 on the mail item if the mail item is not a mail item with a foreign destination.

It can thus be seen that the mail handling method of the invention makes it possible to delay printing of an identity code on the mail item until the routing component for the mail item is determined, which makes it possible to avoid printing an identity code if the mail item has a foreign destination, such printing then being undesirable.

FIG. 2 shows the various component portions of the extended identity code 25 of the invention.

Firstly, and conventionally, the extended identity code 25 comprises an encoded first portion 24' derived from the number 24 of the machine 2 that generated the identity code 25 and a second portion 23' derived from a cyclic iterative sequence number 23 generated by the machine 2. In addition, in accordance with the invention, the extended identity code further comprises a third portion 22' which, in this example, is derived from the routing code 22 extracted by OCR or video coding of the routing component 21 of the address 5 of the mail item 1. It should be understood that the cyclic iterative sequence number 23 from which the second portion 23' of the identity code 25 is derived is generated while taking account of the routing code 22, as shown by the arrow between the routing code 22 and the sequence number 23 in the machine 2. Each routing code 22 is associated with a cyclic iterative sequence in the machine 2. The additional portion 22' makes it possible to achieve a relatively wide identification spectrum for mail items. By way of non-limiting example, the third portion 22' of the identity code 25 is the post code in the distribution address 5. As can be seen in FIG. 2, the portions 22', 23' and 24' are juxtaposed so that the extended identity code of the invention remains compatible with existing outward and inward sorting installations.

The invention claimed is:

1. A method of handling mail items in a mail handling machine, such mail items including foreign destination mail items, and each mail item having a surface including address information, which method comprises:

forming a digital image on the surface of the mail item which includes the address information; and performing an automatic address recognition operation by optical character recognition (OCR) for the purpose of determining the address information of the mail item;

said method being characterized in that:

when the address information cannot be automatically recognized unambiguously, the method further comprises:

deriving a digital imprint from the digital image of the mail item, which digital imprint serves to identify the mail item in the machine in order to perform an address recognition operation by video coding; and generating an identity code for the mail item and printing the idenyity code on the mail item if the address information recognized by video coding corresponds to address information of a mail item that does not have a foreign destination.

2. A method according to claim 1, in which, if the address information has been recognized unambiguously by OCR, the method further comprises generating an identity code for the mail item and printing the idenyity code on the mail item if the address information corresponds to address information of a mail item that does not have a foreign destination.

3. A method according claim 1, in which the identity code is an extended identity code made up of at least one iterative cyclic portion and of a portion derived from the address information recognized by OCR or by video coding.

4. A method according to claim 3, in which the portion derived from the address information is a post code.

5. A method according to claim 3, in which an identity number is assigned to the mail handling machine and in which the extended identity code printed on the mail item includes, inter alia, the identity number of the machine.

6. A machine for handling mail items, said machine being characterized in that said machine is arranged to implement the method according to claim 1.

* * * * *